(12) United States Patent
Fischer et al.

(10) Patent No.: US 6,380,299 B1
(45) Date of Patent: Apr. 30, 2002

(54) STABLE AQUEOUS DISPERSIONS FOR SIZING PAPER

(75) Inventors: Kurt Fischer, Vienna; Marcel Sychra, Krems; Johannes Fallmann, Theiss, all of (AT)

(73) Assignee: Krems Chemis Aktiengesellschaft (AT)

( * ) Notice: Subject to any disclaimer, the term of this patent is extended or adjusted under 35 U.S.C. 154(b) by 0 days.

(21) Appl. No.: 09/601,031

(22) PCT Filed: Jan. 25, 1999

(86) PCT No.: PCT/AT99/00019

§ 371 Date: Jul. 26, 2000

§ 102(e) Date: Jul. 26, 2000

(87) PCT Pub. No.: WO99/37857

PCT Pub. Date: Jul. 29, 1999

(30) Foreign Application Priority Data

Jan. 26, 1999 (AT) .................................. 118/98

(51) Int. Cl.$^7$ ............................. C08K 3/20; C08K 5/15; C08K 5/16; C08K 3/02; C08K 3/30

(52) U.S. Cl. ............................ 524/501; 524/47; 524/62; 524/112; 524/198; 524/364; 524/423; 524/437; 524/501; 106/238

(58) Field of Search .................... 106/238; 524/62, 524/501, 423, 437, 47, 198, 112, 364

(56) References Cited

U.S. PATENT DOCUMENTS

| | | |
|---|---|---|
| 3,966,654 A | 6/1976 | Aldrich |
| 4,374,673 A * | 2/1983 | Aldrich ...................... 106/212 |
| 4,816,073 A * | 3/1989 | Helmer et al. ............... 106/238 |
| 4,983,257 A * | 1/1991 | Schultz et al. ............... 162/158 |
| 5,201,944 A | 4/1993 | Nakata et al. |

FOREIGN PATENT DOCUMENTS

| | | |
|---|---|---|
| DE | 24 26 038 | 12/1975 |
| DE | 37 08 854 A1 | 9/1987 |
| DE | 44 12 136 A1 | 10/1995 |
| EP | 0 018 007 | 10/1980 |
| EP | 0 056 876 | 8/1982 |
| EP | 0 074 544 B2 | 3/1983 |
| EP | 0 150 754 | 8/1985 |
| EP | 0 200 755 | 11/1986 |
| EP | 0 200 002 A1 | 12/1986 |
| EP | 0 200 002 B1 | 12/1986 |
| EP | 0 259 671 A1 | 3/1988 |
| EP | 0 259 671 B1 | 3/1988 |
| EP | 0 275 851 A1 | 7/1988 |
| EP | 0 275 851 B1 | 7/1988 |
| EP | 0 686 727 A2 | 12/1995 |
| EP | 0 719 892 A2 | 7/1996 |
| GB | 2 268 941 A | 1/1994 |
| WO | WO 90/08852 | 8/1990 |

OTHER PUBLICATIONS

Casey, James P., *Pulp and Paper: Chemistry and Chemical Technology*, 2$^{nd}$ edition, New York 1960–61, vol. 2, Chapter 13, pp. 1043–1066.

Kaltenbach, Dr. Josef, Die neuzeitliche papierleimung, Walluf (Germany), 1974, pp. 219–224.

Kamutzki, W. and Th. Krause, "Mechanismen bei der Neutralleimung mit Alkyldiketenen", from *Wochenblatt fur Papierfabrikationen*, No. 7, 1983.

* cited by examiner

*Primary Examiner*—Kriellion A. Sanders
(74) *Attorney, Agent, or Firm*—Venable; George H. Spencer; Ashley J. Wells

(57) ABSTRACT

A method for preparing a paper sizing agent which has improved retention on paper and which is an aqueous dispersion stabilized with a polymer, including the steps of (a) dispersing a resin which is one of a colophonium resin or a compound derived from a colophonium resin in water containing a synthetic emulsifier present in an amount which is a minimal amount effective to prepare a metastable dispersion of the resin so that impairment of sizing action by the synthetic emulsifier is minimized; (b) immediately cooling the metastable dispersion to a cooled temperature; and (c) reacting the metastable dispersion while at a cooled temperature with a polymer which is one of a polymer solution or a polymer dispersion to form a stable dispersion, wherein direct dispersion of the polymer with the resin is avoided.

17 Claims, No Drawings

STABLE AQUEOUS DISPERSIONS FOR SIZING PAPER

BACKGROUND OF THE INVENTION

The present invention relates to novel aqueous dispersions for paper sizing. In particular, the invention relates to aqueous dispersions which essentially comprise reinforced or nonreinforced, esterified or nonesterified colophonium, a synthetic surfactant, a polymer that is water-soluble or can be dispersed in water, optionally an extender, optionally a synthetic sizing agent, optionally an aluminum-containing fixative, and water. The individual components of the novel dispersions will be described in further detail hereinafter. The novel dispersions of this invention are intended for use for finishing paper or cardboard.

In U.S. Pat. No. 3,966,654, aqueous dispersions are described that substantially comprise reinforced colophonium, a water-soluble cationic resin-based dispersant, and water. The dispersant is selected from among the following products: water-soluble aminopolyamide epichlorohydrin resins, water-soluble alkylenepolyamine epichlorohydrin resins, and water-soluble poly (diallylamine) epichlorohydrin resins. The reinforced colophonium is the addition reaction product of colophonium and an acid compound that contains the group

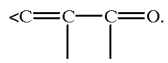

Methods for preparing these dispersions are also disclosed.

In European Patent 0 056 876, aqueous dispersions are described that substantially comprise reinforced colophonium, a cationic starch-based dispersant that is water-soluble or can be dispersed in water, an anionic surfactant, and water. Two methods for preparing these dispersions are described: First, the dispersal can be done from a solution of the resin in an organic solvent (methylene chloride is used in the examples) by evaporation of the solvent in a vacuum, or secondly, by direct mixing of the hot, molten resin with an emulsifier and starch solution in a dispergator at high temperatures and with high shear forces.

In European Patent 0 074 544, aqueous dispersions are described that substantially comprise reinforced colophonium, water-soluble cationic nitrogen-containing dispersants, a synthetic sizing agent that reacts with cellulose, and water.

In European Patent 0 200 755, an aqueous dispersion in a non-saponified, preferably reinforced resin acid is described. This dispersion contains cationic organic compounds, preferably a cationic starch, cationic polyacrylamide, cationic polyamine, cationic polyamidamine, or cationic polyethylenimine. In the aqueous phase, the dispersion contains an aluminum salt, which is a polyaluminum chloride or a polyaluminum sulfate.

In European Patent 0 275 851, a mixture of a resin dispersion with synthetic sizing agent and a polyaluminum compound is claimed. This aqueous dispersion is characterized in that the dispersed phase comprises particles which contain a mixture of resin material and a synthetic sizing agent, and that the dispersion contains a polyaluminum compound in which ion contains at least four aluminum atoms. The mixture of resin material and synthetic sizing agent contains from 10 to 96% of the resin material. The synthetic sizing agent is carbamoyl chloride or ketene dimer. The polyaluminum compound is polyaluminum chloride or polyaluminum sulfate.

European Patent 0 200 002 claims colophonium-based paper sizing agents that are characterized in that the cationization of a stable anionic glue is done with polyaluminum chloride and optionally with the addition of a cationic polymer. International Patent Disclosure WO 90/08852 also describes a method for producing a cationic glue by adding polyaluminum chloride to a stable dispersion of maleic acid anhydride-reinforced colophonium. Both methods have in common the fact that they are based on a stable aqueous dispersion, which must accordingly contain a relatively high proportion of emulsifier, which can adversely affect the sizing action and the cationization behavior.

European Patent 0 150 754 claims colophonium resins reinforced in a special way with formaldehyde and/or α,β-unsaturated carbonyl compounds and at the same time esterified with tertiary amino alcohols, and aqueous anionic dispersions of these resins.

The use of aqueous dispersions that contain colophonium resins for sizing papers has long been known and is described for instance in Casey, Pulp and Paper, 2nd Edition, Volume II: Papermaking, pages 1043–1066, Interscience Publishers, New York, 1961. The colophonium resins, such as wood rosin, balsamic resin, tall resin and the like, are typically reinforced, that is, reacted with α, β-unsaturated carbonyl compounds, before they are processed into dispersions. The reaction of the colophonium resins with α, β-unsaturated carbonyl compounds, such as acrylic acid, fumaric acid, maleic acid or their accessible anhydrides, is based on an adduct formation described by Diels-Alder with resin acids of suitable structure contained in the colophonium resin, and are intended to enhance the yield of the sizing agent. The thus-modified colophonium resins can then be processed into dispersions, for instance by a reversal process.

In German Published, Unexamined Patent Disclosure DE 37 08 854 A1, a sizing agent for use in the neutral range is described, which involves an aqueous dispersion of a colophonium esterified with at least one multivalent alcohol comprising carbon, hydrogen and oxygen, or reinforced colophonium. This sizing agent, in the presence of a very good retention system, does sometimes exhibit good sizing action in the neutral range when bleached sulfate cellulose is employed, but fails completely when so-called "difficult materials" are used, such as sulfite cellulose, ground wood pulp, used paper, TMP, CTMP, etc.

In German Published, Unexamined Patent Disclosure DE 44 12 136 A1, a sizing agent of reinforced colophonium, esterified with triethanolamine, is described which is dispersed with an emulsifier system comprising sodium lignin sulfonate and cationic starch. This sizing agent is intended for body or surface sizing of paper in a pH range of from 4.5 to 8.5. For producing this sizing agent, the use of high-pressure homogenizer at approximately 100° C. is prescribed. Under these dispersing conditions, both severe thermal and mechanical loading on the cationic starch used as an emulsifier or protective colloid occurs, causing a breakdown in its molecular weight. The result is poorer dispersion stability and reduced self-retention of the sizing agent when used in the papermaking machine.

In European Patent 0 259 671 B1, an aqueous dispersion of a sizing agent of reinforced, unreinforced, hydrogenated or disproportionated colophonium, optionally also esterified with amino alcohol, is described, which is dispersed with a dispersant that contains digested caseine and cationic starch. In U.S. Pat. No. 4,983,257, an aqueous dispersion of a sizing agent of reinforced, hydrogenated, disproportionated colophonium, optionally also esterified with amino alcohol, is described which is dispersed with caseine or anionic emulsifier and with cationic starch as a dispersant. For the use of the cationic starch and its effectiveness as a protective colloid and retention agent, the same objections pertain both to European Patent 0 259 671 B1 and U.S. Pat. No. 4,983, 257, as have already been discussed in connection with German Patent Disclosure DE 44 12 136 A1.

In U.S. Pat. No. 5,201,994, an aqueous dispersion of a mixture of colophonium esterified with amino alcohol and reinforced colophonium, which is dispersed with a mixture of anionic emulsifier and caseine as a dispersant, is described.

It is also known that the use of resin sizings based on reinforced and/or unreinforced colophonium resin for paper sizing in the neutral range in the presence of chalk as a filler is associated with major disadvantages. For instance, the resin component, with its free carboxyl groups, can enter into reaction with the chalk, which is associated with a considerable loss of the sizing action. Furthermore, the mode of operation with dispersions on the basis of reinforced and/or unreinforced colophonium resins is associated with the use of considerable quantities of aluminum-containing fixatives. As a consequence, by reaction of calcium carbonate with aluminum sulfate, for example, sharp-edged gypsum crystals can be formed, which make the completed paper useless because of ductor streaks or cuts, and which can damage the polished cylinders of the paper-making machine. Moreover, in the acid range, calcium carbonate can convert into soluble calcium hydrogen carbonate, which leads to an increase in hardness of the water circulating in the papermaking machine. As a rule, dispersions based on reinforced and/or unreinforced colophonium resins can therefore be used only in the acid range, which severely limits the use of chalk or discarded products or used paper that contain chalk. The primary disadvantage of sizing in the acid range, however, as discussed for instance by J. Kaltenbach in "Die neuzeitliche Papierleimung" [Modern Paper Sizing], 2nd Edition (1974), published by Verlag Dr. Martin Sondig GmbH, Walluf, Germany, page 219, is the limited resistance to ageing of the sized paper, since acid residues lead to yellowing and embrittlement of the paper.

These disadvantages can be overcome by so-called neutral sizing, that is, sizing in the pH range above 7, but resin sizing on the basis of reinforced and/or unreinforced colophonium resins can then no longer be used. For neutral sizing on an industrial scale, until now, with the sole exception being the resin sizing dispersions claimed in EP 0 150 754, only synthetically prepared sizing agents have been used, such as dispersions that contain long-chained dimeric alkyl ketenes.

As noted by W. Kamutzki and Th. Krause, in the "Wochenblatt fur Papierfabrikation" [Papermaking Weekly], Number 7 (1983), pages 215–222, such sizing agents have the severe disadvantage, however, that they are not compatible with the aluminum sulfate that is used for many purposes in paper factories. Moreover, partial sizing with such sizing agents can be done only with major difficulties.

With the resin sizing dispersions, described in EP 0 150 754, based on colophonium resins reinforced with formaldehyde and/or α, β-unsaturated carbonyl compounds and esterified with tertiary amino alcohols, even neutral sizing in the pH range above 7, for instance with chalk or precipitated calcium carbonate (PCC) as a filler can be performed. These resin sizing dispersions, according to the examples given in EP0 150 754, involve anionic dispersions with saponified resin as the emulsifier and caseine as the stabilizer, which have been prepared by the known inverse process. The aforementioned resin sizing dispersions exhibit superior properties in sizing in the neutral range with chalk or PCC as the filler, compared with the resin sizing agents based on non-esterified resins, that is, resins mostly reinforced with α, β-unsaturated carbonyl compounds. However, like all other anionic dispersions, this paper sizing agent on the basis of colophonium reinforced with formaldehyde and/or α, β-unsaturated carbonyl compound and esterified with tertiary amino alcohols, exhibits an increased tendency to foaming compared with the cationic resin sizing dispersions, and moreover requires a substantially better retention system compared to the cationic resin sizing dispersions, so as to draw on the cellulose fibers. In addition, these anionic dispersions cannot be mixed with cationic fixatives to achieve a so-called single-component system. As before, the use of natural protective colloids, such as caseine, remains problematic because of the high susceptibility to bacterial infection as well as the high price and increasingly uncertain availability.

The above-described methods for preparing cationic dispersions have the disadvantage that the preparation is done by mixing of the polymer solution with hot, molten resin in the presence of high shear forces. The combination of high temperature and high shear leads to the breakdown of the polymers present in the dispersion. Especially when starch is used, such a breakdown sometimes leads to a loss of the retention action and thus to a reduction in the self-retention of the sizing agent.

German Published, Unexamined Patent Disclosure DE 24 26 038 A1 describes the preparation of an anionic dispersion of a metastable mixture by homogenization in a high-pressure homogenizer. No polymer is added to the cooled dispersion for the sake of stabilization.

British Patent Disclosure GB 2 268 941 A describes an alternative possibility for preparing resin sizing analogously to the dispersions of synthetic sizing agents, in which the softening temperature of the resin is lowered by adding fatty acid. There is no mention of the possibility of reducing the emulsifier metering, with the attendant advantages of doing so.

The object of the invention is to prepare a resin or combination sizing agent that is suitable for neutral sizing, in which the polymer obtained is added in such a way that thermal and/or mechanical damage does not occur. The sizing agent obtained in this way should be compatible with inorganic, aluminum-containing fixatives.

SUMMARY OF THE INVENTION

This object is attained in that in a first step, a metastable dispersion of the resin is prepared with the aid of a minimized quantity of a synthetic emulsifier; this dispersion is immediately cooled and only after that is it reacted cold with the corresponding polymer solution or polymer dispersion to form a stable dispersion. The polymer solution leads to a stabilization of the dispersion. The resin used can be either a colophonium compound or a colophonium compound reinforced with formaldehyde and/or α, β-unsaturated carbonyl compounds, or other reaction products of the colophonium. The emulsifier used can be anionic, cationic, or nonionic.

DESCRIPTION OF THE PREFERRED EMBODIMENTS

The term "colophonium" refers to colophonium resin, tall resin, wood resin and wood rosin, or mixtures of these resins. The suitable modified resins according to the invention also include for instance hydrogenated resins or disproportionated resins.

Surprisingly, it has been discovered that the dispersions prepared by the above-described methods were superior to all other cationic dispersions prepared in accordance with the patents listed above. This was true above all for those material systems in which good retention is decisive for the sizing effect. This can be ascribed to the following reasons:

First, as already mentioned, by the method of the invention the cationic polymer is exposed to neither high temperatures nor high shear forces. As a result, the quality of the starch remains constantly high, and its maximum retention action is preserved.

Second, it is known that emulsifiers are capable of impairing the action of sizing agents. This is prevented by the use of minimal quantities of emulsifier. Furthermore, greater quantities of emulsifiers can lead to problems with foaming in use.

The resin sizing dispersions thus obtained can be mixed in any proportion with dispersions or emulsions of synthetic sizing agents (such as alkenylated succinic acid anhydride, alkyl ketene dimer or carbamoyl chloride), the consequence of which is a combination of the sizing actions of both product components. In the disperse phase, the dispersions of the invention can comprise particles, which contain a mixture of colophonium and synthetic sizing agent, or can comprise particles of colophonium and particles of synthetic resin material.

For the preparation of the dispersions of the invention, not only the normal colophonium resins reinforced with $\alpha$, $\beta$-unsaturated carbonyl compounds can be used, but also resins that are esterified with multivalent alcohols, such as tertiary amino alcohols. These produce better sizing effects in the pH range from 6 to 7.5.

All the dispersions according to the invention can be mixed with aluminum-containing fixatives, which leads to a further improvement in the retention of the sizing agent.

In all the dispersions of the invention, some of the colophonium can be replaced by extenders, which has a favorable effect on the raw material costs of the sizing agent but has no negative effect on the sizing action.

EXAMPLES

Example 1

300 g of a colophonium resin reinforced with fumaric acid were mixed with 1.8 g of a sulfate-based anionic emulsifier and dispersed in 575 g of water. In this way, 877 g of a metastable dispersion with a dry content of 34.5% were obtained. This was cooled down and mixed with 250 g of a 15% solution of cationic starch in water. The stable dispersion thus obtained, with a dry content of 30%, was tested for its sizing action.

Parallel to this, 300 g of the same resin were dispersed directly in a solution of 37.5 g of the same starch and 1.8 g of the same emulsifier in 825 g of water. This dispersion, also with a dry content of 30%, was tested analogously.

The testing was done at 45° C. in the laboratory sheet maker with sulfate cellulose at pH 5.5. The metering of sizing agent was 0.8% of dry substance on dry cellulose.

| | Result: | |
| --- | --- | --- |
| | Dispersal according to the invention | Direct cationic dispersal |
| Sizing (Cobb 60 [g/m$^2$]) | 20.4 g/m$^2$ | 25.3 g/m$^2$ |

Example 2

300 g of a colophonium resin reinforced with maleic acid anhydride were mixed with 1.8 g of a sulfate-based anionic emulsifier and dispersed in 575 g of water. In this way, 877 g of a metastable dispersion with a dry content of 34.5% were obtained. This was cooled down and mixed with 250 g of a 15% solution of cationic starch in water. The stable dispersion thus obtained, with a dry content of 30%, was tested for its sizing action.

Parallel to this, 300 g of the same resin were dispersed directly in a solution of 37.5 g of the same starch and 1.8 g of the same emulsifier in 825 g of water. This dispersion, also with a dry content of 30%, was tested analogously.

The testing was done at 45° C. in the laboratory sheet former with sulfate cellulose at pH 5.5. The metering of sizing agent was 0.8% of dry substance on dry cellulose.

| | Result: | |
| --- | --- | --- |
| | Dispersal according to the invention | Direct cationic dispersal |
| Sizing (Cobb 60 [g/m$^2$]) | 20.6 g/m$^2$ | 27.8 g/m$^2$ |

Example 3

300 g of a colophonium resin reinforced with fumaric acid and esterified with triethanolamine were mixed with 1.8 g of a sulfate-based anionic emulsifier and dispersed in 575 g of water. In this way, 877 g of a metastable dispersion with a dry content of 34.5% were obtained. This was cooled down and mixed with 250 g of a 15% solution of cationic starch in water. The stable dispersion thus obtained, with a dry content of 30%, was tested for its sizing action.

Parallel to this, 300 g of the same resin were dispersed directly in a solution of 37.5 g of the same starch and 1.8 g of the same emulsifier in 825 g of water. This dispersion, also with a dry content of 30%, was tested analogously.

The testing was done at 45° C. in the laboratory sheet former with sulfate cellulose at pH 7.0. The metering of sizing agent was 0.8% of dry substance on dry cellulose.

| | Result: | |
| --- | --- | --- |
| | Dispersal according to the invention | Direct cationic dispersal |
| Sizing (Cobb 60 g/m$^2$]) | 19.9 g/m$^2$ | 24.5 g/m$^2$ |

Example 4

300 g of a colophonium resin reinforced with fumaric acid were mixed with 1.8 g of a sulfate-based anionic emulsifier and dispersed in 575 g of water. In this way, 877 g of a metastable dispersion with a dry content of 34.5% were obtained. This was cooled down and mixed with 250 g of a 15% solution of cationic starch in water. Another 200 g of polyaluminum chloride solution (17% aluminum oxide) were added to 800 g of the thus-obtained dispersion. The stable dispersion thus obtained, with a dry content of 33%, was tested for its sizing action.

Parallel to this, 300 g of the same resin were dispersed directly in a solution of 37.5 g of the same starch and 1.8 g of the same emulsifier in 825 g of water and also mixed with polyaluminum chloride solution, in a proportion of 8:2. This dispersion, also with a dry content of 33%, was tested analogously.

The testing was done at 45° C. in the laboratory sheet former with sulfate cellulose at pH 5.5. The metering of sizing agent was 0.8% of dry substance on dry cellulose.

| | Result: | |
|---|---|---|
| | Dispersal according to the invention | Direct cationic dispersal |
| Sizing (Cobb 60 g/m$^2$]) | 22.8 g/m$^2$ | 29.3 g/m$^2$ |

Example 5

300 g of a colophonium resin reinforced with fumaric acid and esterified with triethanolamine were mixed with 1.8 g of a sulfate-based anionic emulsifier and dispersed in 575 g of water. In this way, 877 g of a metastable dispersion with a dry content of 34.5% were obtained. This was cooled down and mixed with 250 g of a 15% solution of cationic starch in water. Another 200 g of polyaluminum chloride solution (17% aluminum oxide) were added to 800 g of the thus-obtained dispersion. The stable dispersion thus obtained, with a dry content of 33%, was tested for its sizing action.

Parallel to this, 300 g of the same resin were dispersed directly in a solution of 37.5 g of the same starch and 1.8 g of the same emulsifier in 825 g of water and mixed with polyaluminum chloride solution, again in a proportion of 8:2. This dispersion, also with a dry content of 33%, was tested analogously.

The testing was done at 45° C. in the laboratory sheet former with sulfate cellulose at pH 7.0. The metering of sizing agent was 0.8% of dry substance on dry cellulose.

| | Result: | |
|---|---|---|
| | Dispersal according to the invention | Direct cationic dispersal |
| Sizing (Cobb 60 g/m$^2$]) | 20.4 g/m$^2$ | 26.5 g/m$^2$ |

Example 6

270 g of a colophonium resin reinforced with fumaric acid were melted with 30 g of AKD wax (alkyl ketene dimer), were mixed with 1.8 g of a sulfate-based anionic emulsifier and dispersed in 575 g of water. In this way, 877 g of a metastable dispersion with a dry content of 34.5% were obtained. This was cooled down and mixed with 250 g of a 15% solution of cationic starch in water. Another 200 g of polyaluminum chloride solution (17% aluminum oxide) were added to 800 g of the thus-obtained dispersion. The stable dispersion thus obtained, with a dry content of 33%, was tested for its sizing action.

Parallel to this, 300 g of the same resin were dispersed directly in a solution of 37.5 g of the same starch and 1.8 g of the same emulsifier in 825 g of water and mixed with polyaluminum chloride solution, again in a proportion of 8:2. This dispersion, also with a dry content of 33%, was tested analogously.

The testing was done at 45° C. in the laboratory sheet former with sulfate cellulose at pH 5.5. The metering of sizing agent was 0.8% of dry substance on dry cellulose.

| | Result: | |
|---|---|---|
| | Dispersal according to the invention | Direct cationic dispersal |
| Sizing (Cobb 60 [g/m$^2$]) | 19.8 g/m$^2$ | 23.5 g/m$^2$ |

Example 7

285 g of a colophonium resin reinforced with fumaric acid and esterified with triethanolamine were melted with 15 g of paraffin wax as an extender, mixed with 1.8 g of a sulfate-based anionic emulsifier and dispersed in 575 g of water. In this way, 877 g of a metastable dispersion with a dry content of 34.5% were obtained. This was cooled down and mixed with 250 g of a 15% solution of cationic starch in water. Another 200 g of polyaluminum chloride solution (17% aluminum oxide) were added to 800 g of the thus-obtained dispersion. The stable dispersion thus obtained, with a dry content of 33%, was tested for its sizing action in comparison to the extender-free dispersion (Example 5).

The testing was done at 45° C. in the laboratory sheet former with sulfate cellulose at pH 7.0. The metering of sizing agent was 0.8% of dry substance on dry cellulose.

| | Result: | |
|---|---|---|
| | Dispersal with extender | Dispersal without extender |
| Sizing (Cobb 60 [g/m$^2$]) | 20.5 g/m$^2$ | 20.4 g/m$^2$ |

Example 8

According to European Patent 0 056 876, 120 g of cationic wax cornstarch were suspended in 1000 ml of distilled water, and the pH value of the mixture was adjusted with sulfuric acid to 4. The mixture was heated for 30 minutes to 95° C., then cooled down to room temperature and diluted to 1200 g with distilled water.

570 g of the resin (colophonium resin, reinforced with fumaric acid) used in Example 1 were dissolved in 380 g of methylene chloride. 1145 g of the aforementioned starch solution were mixed with 38 g of a 4% caustic soda solution and added to the resin solution. The resultant mixture was stirred for one minute and then homogenized twice in a high-pressure homogenizer. The methylene chloride found in the mixture was removed by vacuum distillation.

The testing was done analogously to Example 1.

| | Result: | |
|---|---|---|
| | Dispersion from Example 1 | Dispersion from EP 0 056 876 |
| Sizing (Cobb 60 [g/m²]) | 20.4 g/m² | 62.3 g/m² |

What is claimed is:

1. A method for preparing a paper sizing agent which has improved retention on paper and which is an aqueous dispersion stabilized with a polymer, the method comprising the steps of:
   a. dispersing a resin which is one of a colophonium resin or a compound derived from a colophonium resin in water containing a synthetic emulsifier present in an amount which is a minimal amount effective to prepare a metastable dispersion of the resin so that impairment of sizing action by the synthetic emulsifier is minimized;
   b. immediately cooling the metastable dispersion to a cooled temperature; and
   c. reacting the metastable dispersion while at a cooled temperature with a polymer which is one of a polymer solution or a polymer dispersion to form a stable dispersion,
   wherein direct dispersion of the polymer with the resin is avoided.

2. The method according to claim 1, further comprising the step of adding to the stable dispersion obtained in step (c) at least one substance selected from the group consisting of an aluminum-ion-containing fixative, a synthetic sizing agent, and an extender.

3. The method of claim 2, wherein the dispersion contains an extender selected from the group consisting of paraffin wax and mineral oil, and wherein the extender is added to the resin before dispersing in step (a) or to the stable dispersion of step (c).

4. The method of claim 1, wherein, the resin is a colophonium resin reinforced with , β-unsaturated carbonyl compounds.

5. The method of claim 4, wherein the resin is a colophonium resin reinforced with fumaric acid.

6. The method of claim 4, wherein the resin is a colophonium resin reinforced with maleic acid anhydride.

7. The method of claim 4, wherein the at least one substance added to the stable dispersion of step (c) is selected from the group consisting of aluminum sulfate, potassium aluminum sulfate, polyaluminum sulfate, and polyaluminum chloride.

8. The method of claim 1, wherein the resin is a colophonium resin reinforced with , β-unsaturated carbonyl compounds and additionally esterified with a multivalent alcohol.

9. The method of claim 8, wherein the colophonium resin is a colophonium resin reinforced with fumaric acid and esterified with triethanolamine.

10. The method of claim 1, wherein the synthetic emulsifier is a synthetic anionic emulsifier.

11. The method of claim 10, wherein the synthetic anionic emulsifier is sulfate-based.

12. The method of claim 1, wherein the polymer is a cationic starch,
   wherein shear forces and temperatures which would be effective to degrade the cationic starch are avoided in every step involving the cationic starch so that the quality of the cationic starch is maintained, and
   wherein cooling in step (b) is to a temperature which is effective to prevent degradation of the cationic starch.

13. The method of claim 1, further comprising melting the resin with a synthetic sizing agent prior to step (a) to provide a melted mixture which contains from 5 to 95% by weight of the resin.

14. The method of claim 13, wherein the synthetic sizing agent is selected from the group consisting of an alkenylated succinic acid anhydride (ASA), an alkyl ketene dimer (AKD), and a carbamoyl chloride.

15. The method of claim 1, further comprising:
   preparing one of a dispersion or an emulsion of at least one arbitrary synthetic sizing agent selected from the group consisting of an alkenylated succinic acid anhydride (ASA), an alkyl ketene dimer (AKD), and a carbamoyl chloride, and
   mixing the stable dispersion obtained in step (c) with the one of a dispersion or an emulsion of at least one arbitrary synthetic sizing agent to provide a mixture containing from 5 to 95% by weight of the resin of the stable dispersion.

16. The method of claim 1, further comprising adding an extender selected from the group consisting of paraffin wax and mineral oil to the resin in step (a) before or after dispersing in step (a).

17. A method for preparing a paper sizing agent which has improved retention on paper and which is an aqueous dispersion of a resin stabilized with a polymer, the method comprising the steps of:
   a. dispersing a resin which is one of a colophonium resin or a compound derived from a colophonium resin in water containing a synthetic emulsifier present in an amount which is a minimal amount effective to prepare a metastable dispersion of the resin so that impairment of sizing action of the paper sizing agent by the synthetic emulsifier is minimized;
   b. immediately cooling the metastable dispersion to a cooled temperature; and
   c. reacting the metastable dispersion while at a cooled temperature with the polymer which is a cationic starch and which is one of a polymer solution or a polymer dispersion to form a stable dispersion and provide the paper sizing agent,
   wherein shear forces and temperatures which would be effective to degrade the cationic starch are avoided in every step involving the cationic starch so that the quality of the cationic starch is maintained,
   wherein cooling in step (b) is to a temperature which is at least effective to prevent degradation of the cationic starch, and
   wherein direct dispersion of the polymer with the resin is avoided.

\* \* \* \* \*

UNITED STATES PATENT AND TRADEMARK OFFICE
CERTIFICATE OF CORRECTION

PATENT NO.   : 6,380,299 B1
DATED        : April 30, 2002
INVENTOR(S)  : Kurt Fischer, Marcel Sychra and Johannes Fallmann It is certified that error appears in the above-identified patent and that said Letters Patent is hereby corrected as shown below:

<u>Title page,</u>
Item [30], please delete "Jan. 26, 1999" and insert therefore -- Jan. 26, 1998 --

Signed and Sealed this

Eighteenth Day of June, 2002

*Attest:*

*Attesting Officer*

JAMES E. ROGAN
*Director of the United States Patent and Trademark Office*